(12) United States Patent
Hiroki (10) Patent No.: US 6,681,916 B2
(45) Date of Patent: *Jan. 27, 2004

(54) TRANSFER SYSTEM FOR CONVEYING LCD GLASS SUBSTRATE

(75) Inventor: Tsutomu Hiroki, Yamanashi (JP)

(73) Assignee: Tokyo Electron Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 61 days.

(21) Appl. No.: 09/959,720

(22) Filed: Nov. 6, 2001

(65) Prior Publication Data

US 2003/0168313 A1 Sep. 11, 2003

(30) Foreign Application Priority Data

May 6, 1999 (JP) ............................. 11/126323

(51) Int. Cl.$^7$ ................................................ B65G 1/00
(52) U.S. Cl. ................... 198/347.1; 198/347.4; 198/607; 198/435; 198/456
(58) Field of Search .................. 198/347.1, 347.4, 198/607, 456, 435

(56) References Cited

U.S. PATENT DOCUMENTS

| | | | | |
|---|---|---|---|---|
| 3,466,835 A | * | 9/1969 | Temple | 53/448 |
| 3,565,725 A | * | 2/1971 | Siempelkamp | 425/168 |
| 4,585,386 A | * | 4/1986 | Gomann et al. | 414/403 |
| 4,867,299 A | * | 9/1989 | Fukuoka et al. | 198/435 |
| 4,895,244 A | * | 1/1990 | Flaugher et al. | 198/394 |
| 4,995,769 A | * | 2/1991 | Berger et al. | 414/403 |
| 5,253,743 A | * | 10/1993 | Haas et al. | 198/347.1 |
| 5,350,050 A | * | 9/1994 | Franke | 198/347.1 |
| 5,441,141 A | * | 8/1995 | Bonnet | 198/370.03 |
| 5,927,469 A | * | 7/1999 | Dunifon et al. | 198/456 |
| 6,478,137 B2 | * | 11/2002 | Hebels et al. | 198/347.1 |

FOREIGN PATENT DOCUMENTS

| | | | |
|---|---|---|---|
| JP | 52-22065 | * | 5/1977 |
| JP | 05-178413 | * | 7/1993 |

* cited by examiner

Primary Examiner—Joseph E. Valenza
Assistant Examiner—Richard Ridles
(74) Attorney, Agent, or Firm—Finnegan, Henderson, Farabow, Garrett & Dunner, LLP (57) ABSTRACT

A system for conveying LCD glass substrates 100 traveling between processing devices 210, 220 and 230 and conveying LCD glass substrates. The conveyor system 100 includes an upper conveyor 110 for conveying LCD glass substrates in the feeding direction between processing devices, a lower conveyor 120 arranged so as to form a multi-storied structure together with the upper conveyor for conveying LCD glass substrates in the return direction between processing devices, and a vertical conveyor for vertically conveying LCD glass substrates from the upper conveyor to the lower conveyor or vice versa. The vertical conveyor is provided with a plurality of conveyor tables, of which each is able to support the a LCD glass substrate from the underside thereof and moving it up and down linking to each other. One conveyor table forms a part of the upper conveyor while the another conveyor table forms a part of the lower conveyor. Being constructed like this, the conveyor system 100 according to the invention is able to convey even an enlarged LCD glass substrate with ease, and it comes to not only contribute to reduction in construction cost but also to additionally function as a buffer for LCD glass substrates.

13 Claims, 6 Drawing Sheets

FIG.6 ical Field of the Invention

TRANSFER SYSTEM FOR CONVEYING LCD GLASS SUBSTRATE

TECHNICAL FIELD OF THE INVENTION

The present invention relates to a system for conveying a liquid crystal display glass substrate (referred to as 'LCD glass substrate conveyor system'or merely as 'conveyor system'hereinafter).

TECHNICAL BACKGROUND OF THE INVENTION

In a processing system of the general type for processing LCD glass substrates, a plurality of processing devices such as a coater, a developer, an etching system and so forth are usually arranged side by side with the line of a LCD glass substrate conveyor system. In addition, in the LCD glass substrate conveyor system of the LCD glass substrate processing system, there is used an unmanned vehicle as called an Automatic Guided Vehicle (AGV) capable of freely walking around and visiting various processing devices accompanied by a cassette which holds approximately 20 sheets of the LCD glass substrates therein. So far, the LCD glass substrate has been formed to have such a size of 300 through 500 square millimeters at the largest. Therefore, it has been possible to hold a plurality of LCD glass substrates of such size in a cassette and to carry them together with the cassette by means of the AGV.

Recently, however, the LCD glass substrate is showing a tendency to grow larger, and even LCD glass substrates having a size of one square meter or more become available and used now. However, such larger LCD glass substrates causes such a new problem that they are apt to be bent when they are mounted on and held in the cassette. Thus, there has been caused such a problem that the cassette conveyance of LCD glass substrates by using AGV can not help receiving certain limitations from the standpoint of the size and weight of the LCD glass substrate itself.

Furthermore, the AGV is so expensive that the number of AGV's allowed to use for one processing system is limited naturally. Therefore, the improvement of the working efficiency can not help encountering difficulty due to this limitation issue on the size and weight of the LCD glass substrate.

Still further, in order to comply with the randomness in the processing time by the processing system, there has been proposed a processing system of the other type, which is additionally provided with a buffering function for the LCD glass substrate. In order to add such buffering function, various ways have been proposed, for instance, a method for temporarily stopping the operation of the conveyor system. However, this method is not always desirable because it results in lowering the throughput. Another method is a method for adopting an exclusive space for enabling the buffering function for LCD glass substrates. However, when considering the tendency of the LCD glass substrate growing larger as describe above, this method would naturally invites the enlargement of the total area (referred to as 'footprint') needed for realizing the buffering function for LCD glass substrates. Accordingly, this would invite another issue to be solved after all.

The present invention has been made in view of such problems existing in the prior art LCD glass substrate conveyor system as described in the above. Therefore, the first object of the invention is to provide a novel and improved LCD glass substrate conveyor system, which is able to convey LCD glass substrates with ease regardless of the size and weight thereof.

Furthermore, the second object of the invention is to provide a novel and improved LCD glass substrate conveyor system, which can be set up without making use of any expensive device such as the AGV, thereby reducing the cost for constructing the processing system.

Still further, the third object of the invention is to provide a novel and improved LCD glass substrate conveyor system, which is able to add the buffering function for LCD glass substrates to the conveyor system without giving any influence over the throughput and footprint as well.

DISCLOSURE OF THE INVENTION

In order to solve such problems as described above, according to the first aspect of the invention, there is provided a LCD glass substrates conveyor system workable between a plurality of processing devices. This conveyor system comprises an outward conveyance means for conveying LCD glass substrates in the feeding direction between a plurality of processing devices; an inward conveyance means arranged to make a multi-storied structure together with the outward conveyance means for conveying LCD glass substrates in the return direction between a plurality of the processing devices; a vertical conveyance means for vertically conveying LCD glass substrates between the outward conveyance means and inward conveyance means, wherein the vertical conveyance means is provided with a plurality of conveyor tables for supporting LCD glass substrates from the underside thereof and moves up and down the conveyor tables such that they move linking to each other, and one of the conveyor tables forms a part of the outward conveyance means, another of the conveyor tables forms a apart of the inward conveyance means, and still another of the conveyor table forms a refuge portion for the LCD glass substitutes.

According to the structure of the conveyor system as described above, LCD glass substrates can be conveyed between processing devices by means of the multi-storied outward and inward conveyance means. Such outward and inward conveyance means are arranged at a predetermined interval and can be formed by a series of the substrate conveyance means, for instance conveyor rollers which support the LCD glass substrate from the underside thereof. Accordingly, this can easily comply with the tendency of the LCD glass substrate growing larger.

Furthermore, the structure of the above outward conveyance means and inward conveyance means can be produced at a very low cost comparing with the AGV having been used so far. Thus, the construction cost of the LCI) glass substrate conveyor system can be reduced to a great extent.

Since there is provided a refuge portion for saving LCD glass substrate from the outward and inward conveyance means, the buffering function for LCD glass substrate is added without stopping the operation of the outward and inward conveyance means. Thus, this prevents the throughput from being reduced. Furthermore, as the refuge portion is provided to stand in the vertical direction, any increase is not invited with regard to the foot print.

Still further, it is possible to provide a transfer arm for conveying the LCD glass substrate between the conveyor table forming the refuge portion for the LCD glass substrate of the vertical conveyance means and processing device. With this structure, while the LCD glass substrate staying in the refuge portion is treated in and returned from the processing device, one conveyor table of the vertical conveyance means forms a part of the outward conveyance means, and the other conveyor table forms a part of the inward conveyance means. As a result, the other LCD glass substrate can be conveyed to the other processing device to receive the other treatment without stopping the operation of the outward conveyance means and inward conveyance means.

Still further, the transfer arm may be constructed as follows. That is, the conveyor table is provided with a plurality of conveyor rollers for supporting the LCD glass substrate thereon. Therefore, the pick of the transfer arm can be inserted in a gap formed between the LCD glass substrate and plural rollers, thus the transfer arm being able to grasp and transfer the LCD glass substrate by making use of this gap.

The outward conveyance means, the inward conveyance means and vertical conveyance means respectively include portions some of which may be arranged in the atmospheric pressure area and the other has to be arranged in the vacuumed area. These portions respectively belonging to the different circumstances can be connected by way of a gate valve. With this structure, there can be realized the connection for connecting the outward conveyance means with the inward conveyance means across the atmospheric area and vacuumed area.

Furthermore, the vertical conveyance means has the function of switching the LCD glass substrate being conveyed in the return direction (feeding direction) to direct it in the feeding direction (return direction). This makes it possible to set up such treatment steps that have the LCD glass substrate treated by means of an identical processing device a plurality of times. In other words, the conveyor system can flexibly comply with variation or modification in the treatment steps, accordingly.

Still further, the outward conveyance means and inward conveyance means are respectively constructed such that they are provided with a series of substrate conveyance means which are arranged at a predetermined distance to support the LCD glass substrate from the underside thereof. Such substrate conveyance means can be equipped to be individually driven, respectively. Therefore, according to the structure of these outward conveyance means and inward conveyance means, it becomes possible to temporarily stop the LCD glass substrate conveyed by these outward or inward conveyance means. Thus, the LCD glass substrate can be directly taken out from the outward or inward conveyance means and be brought in the related processing device.

Still further, similar to the above, the conveyor table of the vertical conveyance means is provided with a series of substrate conveyance means which are arranged at a predetermined distance to support the LCD glass substrate from the underside thereof. Such substrate conveyance means can be equipped to be individually driven, respectively. Thus, the LCD glass substrate can be brought in the related processing device from the refuge portion thereof.

Still further, the LCD glass substrate can be conveyed in the state of being housed in a tray. Accordingly, the LCD glass substrate can be prevented from being bent even if it is enlarged in size and is increased in weight as well.

Still further, while LCD glass substrate is conveyed, it might possibly happen that the LCD glass substrate is charged electrostatically and/or it carries foreign bodies fitted thereto. If the LCD glass substrate is left as it is in such a state, an ill influence is given to the treatment thereof in the processing device. Therefore, it is preferable, as is done according to the invention, that an electrostatic charge remover means for eliminating electric charges and a foreign body remover means for preventing the foreign bodies from fitting on the LCD glass substrate are equipped with the refuge portion of the vertical conveyance means. As such a foreign body remover means, there can be used a clean air blower means or the like capable of blowing clean air against the LCD glass substrate.

Furthermore, if the LCD glass substrate is brought in the processing device from the refuge portion of the vertical conveyance means, delivery and acceptance of the LCD glass substrate between the processing device and conveyor system can be executed without causing any disturbance with respect to conveying of the other LCD glass substrates.

BRIEF DESCRIPTION OF THE DRAWINGS

FIG. 4 includes illustrations for explaining in detail a conveyor table for use in the vertical conveyance means, the illustration (A) being a perspective view of the conveyor table and the illustration (B) being a side view of the same.

BEST EMBODIMENTS FOR EXECUTING THE INVENTION

In the following, the best embodiment for executing an LCD glass substrate conveyor system according to the invention will now be described in detail with reference to the accompanying drawings. In this specification and drawings attached hereto, the like part in each of the several figures are denoted with the like reference character in order to avoid redundant repetitive description thereabout.

Figure 1:
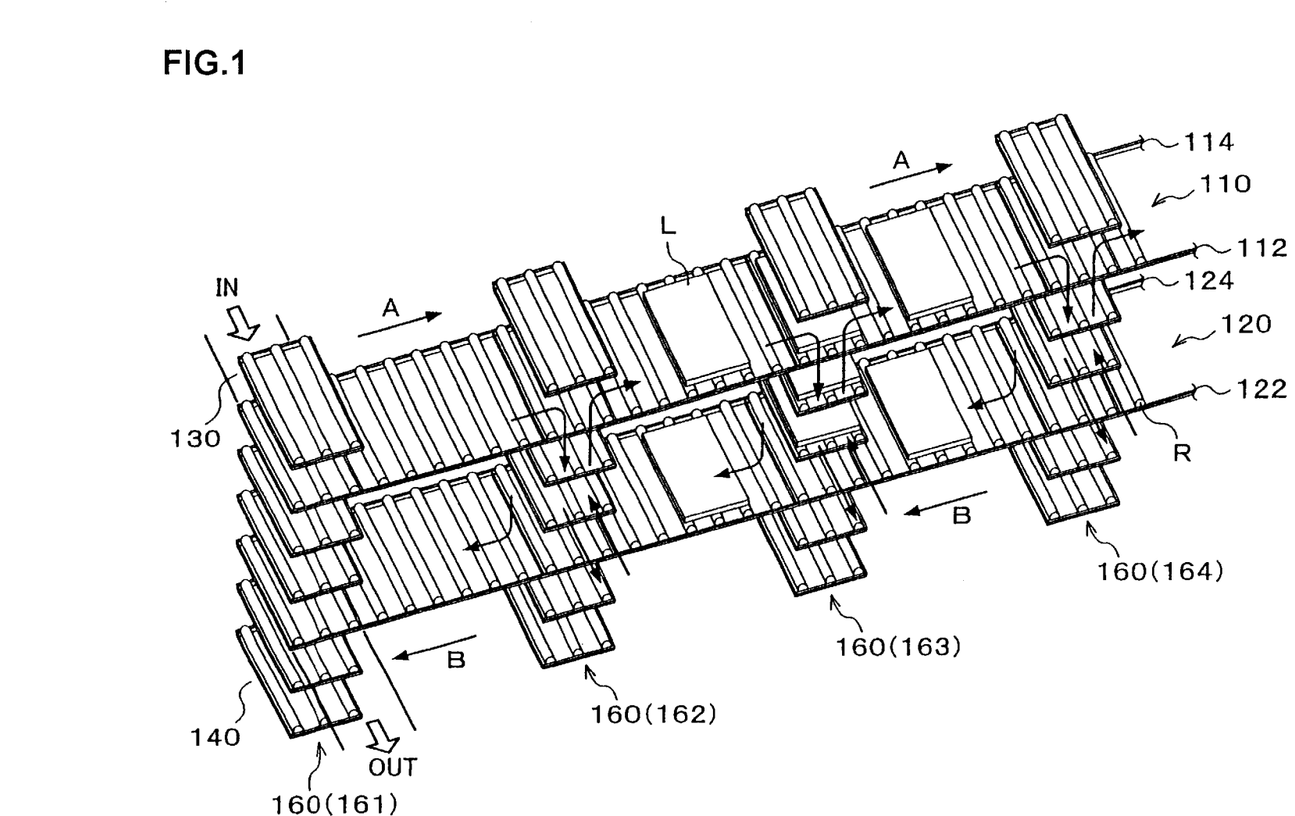
FIG. 1 is a schematic perspective view of an embodiment of a conveyor system according to the invention.

As shown in FIG. 1, an LCD glass substrate conveyor system 100 includes an upper conveyor 110 constituting an outward conveyance means for conveying LCD glass substrates L in the direction as shown by an arrow A in the figure, that is, from the left side to the right side of the drawing paper (referred to as 'feeding direction' hereinafter), a lower conveyor 120 constituting an inward conveyance means for conveying LCD glass substrates L in the direction as shown by an arrow B in the figure, that is, from the right side to the left side of the drawing paper (referred to as 'return direction' hereinafter), and a plurality of vertical conveyors 161, 162, 163 and 164 for conveying LCD glass substrates L in the vertical direction between the upper and lower conveyors 110 and 120.

These vertical conveyors 161, 162, 163 and 164 play a role of a delivery and acceptance means for giving and receiving the LCD glass substrate L between the upper and lower conveyors 110 and 120 in order to switch the conveying direction, and at the same time, they function as a buffer for the LCD glass substrate L. With regard to this point, the more detailed description will be made latter. Such vertical conveyors can be arranged between the upper and lower conveyors 110 and 120 by an arbitrary number of them so as to suitably meet the scale of the processing system and other conditions. Each of vertical conveyors 161, 162, 163 and 164 has a substantially same structure, so that when explaining their structures and functions in common, they will be explained by way of a vertical conveyor 160 representing all of them, thereby omitting redundant repetitive description thereabout.

In the example as shown in FIG. 1, the LCD glass substrate L to be processed is first brought in the bring-in portion 130 from the outside of the conveyor system 100. The upper conveyor 110 conveying the LCD glass substrate L in the feeding direction is arranged to extend from the bring-in portion 130 in the horizontal direction. The LCD glass substrate L having been processed is conveyed to the outside of the conveyor system 100 passing through a bring-out portion 140. The lower conveyor 120 returning the LCD glass substrate L in the return direction is arranged to extend from the bring-out portion 140 of the LCD glass substrate L in the horizontal direction. Now, in the following, let us describe in detail the structure of the upper conveyor 110, the lower conveyor 120 and vertical conveyor 160, respectively.

As shown in FIG. 1, a plurality of upper conveyors 110 are arranged to extend at a predetermined interval from the bring-in portion 130, and each of them is provided with a series of conveyor rollers R supporting the LCD glass substrate L from the underside thereof. Each conveyor roller R is supported at both ends thereof by support members 112 and 114. Furthermore, each conveyor roller R is provided with an individual driving mechanism, which can individually drive the conveyor roller R to rotate them, and also can individually stop the same. The upper conveyor 110 drives a series of conveyor rollers R to rotate them clockwise at a same rotation speed, thereby supporting the LCD glass substrate L from the underside thereof and conveying the LCD glass substrate L in the feeding direction. Here, it is advised that the driving mechanism for the conveyor roller R does not constitute the feature of the invention and it may be possible to adopt a suitable prior art mechanism. Therefore, the detailed description about the driving mechanism will be omitted herein.

Also, as shown in FIG. 1, a plurality of lower conveyors 120 are arranged to extend at a predetermined interval from the bring-out portion 140 and are provided with a series of conveyor rollers R supporting the LCD glass substrate L from the underside thereof. Each conveyor roller R is supported at its both ends by support members 122 and 124. Furthermore, similar to the conveyor rollers R constituting the above-mentioned upper conveyor 110, each conveyor roller R is provided with an individual driving mechanism, which can individually drive the conveyor roller R to rotate it, and can individually drive the same to stope rotation thereof. The lower conveyor 120 drives a series of conveyor rollers R to rotate them counter clockwise at a same rotation speed, thereby supporting the LCD glass substrate L from the underside thereof and conveying it in the return direction.

Figure 2:
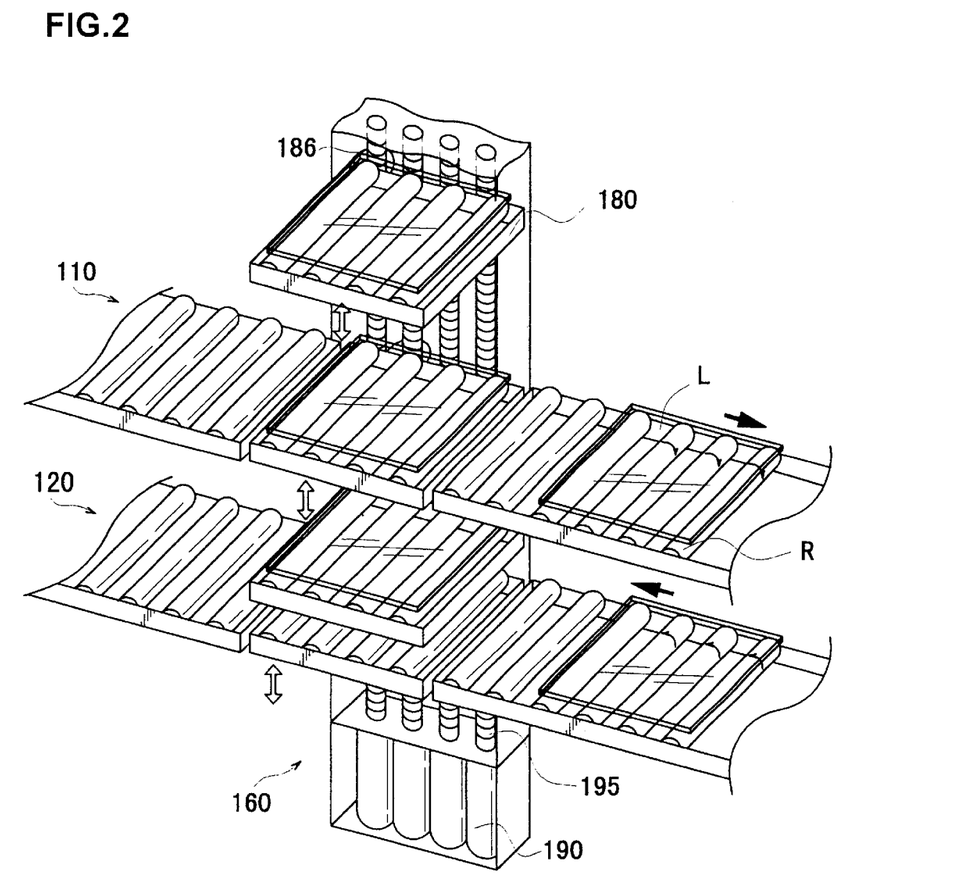
FIG. 2 is a schematic perspective illustration showing the mechanism of a vertical conveyance means.

The mechanism of the vertical conveyor 160 will now be described with reference to FIG. 2. As will be seen from FIG. 2, the vertical conveyor 160 vertically conveys the LCD glass substrate L between the upper and lower conveyor 110 and 120. In the example shown in FIG. 2, there is provided a four storied conveyor tables 180, and a motor 190 and a ball screw 195 are prepared for each of conveyor tables 180. Each conveyor table 180 is connected with the corresponding ball screw 195 through a connection portion 186, and is made to move up and down by driving a corresponding motor 190. With the structure like this, it becomes possible to move up and down each conveyor table 180 separately. Furthermore, it becomes also possible to move up and down each of the conveyor tables all at once if each of them is linked to a common motor and a common ball screw.

In the next, it will be described how the vertical conveyor 160 functions as a buffer for the LCD glass substrate L with reference to FIG. 3. As will be seen from FIG. 3, the vertical conveyor 160 is provided with a plurality of conveyor plates 180, which respectively supports a LCD glass substrate L from the underside thereof and are linked with each other to moves up and down all together. In the example shown in FIG. 3, there are illustrated only conveyor plates 180a, 180b ... 108h. However, the number of conveyor tables installed on one vertical conveyor 160 may be suitably designed so as to meet the scale of the conveyor system. Each of conveyor tables 180a, 180b ... 108h has a substantially same structure, so that when explaining their structures and functions in common, they will be explained by way of a conveyor table 180 representing all of them, thereby omitting the redundant repetitive description thereabout.

Figure 3:
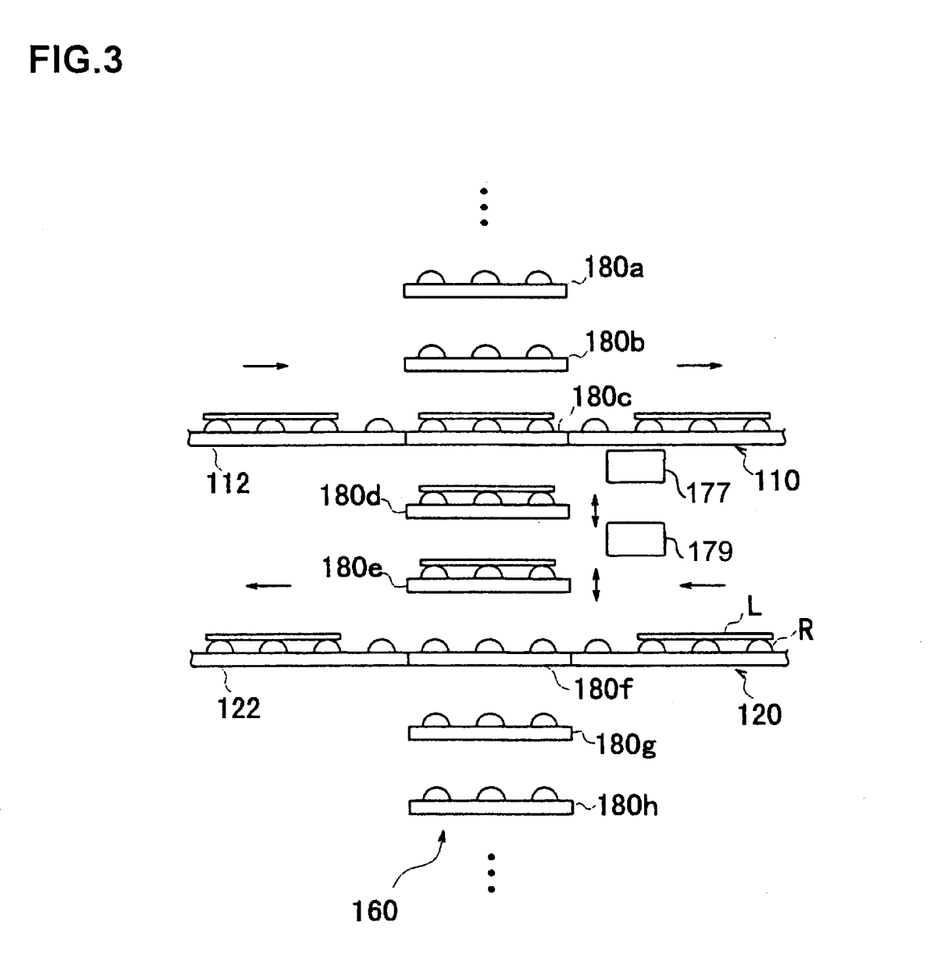
FIG. 3 is a schematic side view of the embodiment according to the invention.

In FIG. 3, one of a plurality of conveyor tables forms a part of the upper conveyor 110 while the another of the same forms a part of the lower conveyor 120. In the example shown in this figure, the conveyor table 18c forms a part of the upper conveyor 110 while the conveyor table 18f forms a part of the lower conveyor 120. The other conveyor table, that is, indicated by reference numerals 180a, 180b, 180d, 180e, 180g and 180h serves as a refuge portion for the LCD glass substrate L. That is, in order not to be affected by the randomness in the processing time, there is a case where it is needed for the LCD glass substrate L to be temporarily saved as a refugee. That is, the conveyor tables 180a, 180b, 180d, 180e, 180g and 180h function as a refuge portion (i.e. buffer) for the LCD glass substrate L.

Now, for better understanding, how to LCD glass substrates L are buffered will now be described with reference to FIG. 3. Both of the upper and lower conveyor 110 and 120 are stopped when one LCD glass substrate L is put on the conveyor table 180f. Then, if the vertical conveyor 160 is made to move up by one story (step), two conveyor tables 180d and 180d come to form corresponding parts of the upper and lower conveyor 110 and 120, respectively. In the next, if the upper and lower conveyors 110 and 120 are operated, another LCD glass substrate L is put on the conveyor table 180g. Then, if the vertical conveyor 16 is made to further move up by one story, two conveyor tables 180f and 180g come to form corresponding parts of the upper and lower conveyor 110 and 120, respectively, thereby conveyor tables 180f and 180g come to function as buffers, respectively.

After this, LCD glass substrates L on the conveyor tables 180f and 180g are taken out in sequence by a transfer arm (described later), and are treated by processing device. The LCD glass substrate after having been treated are again returned to the conveyor tables 180f and 180g, respectively. Then, the LCD glass substrate L put on the vertical conveyor 160 is moved down in reverse to the above and is conveyed in the return direction by the lower conveyor. AS the vertical conveyor 16 functions as the buffer like this, the upper and lower conveyors 110 and 120 are able to convey other LCD glass substrates L even while two LCD glass substrates L are being processed.

In the above description, the buffering operation is described with respect to the LCD glass substrate L conveyed over the lower conveyor 120, but the same buffering operation is possible with respect to the LCD glass substrate L conveyed over the upper conveyor 110.

Figure 4A:
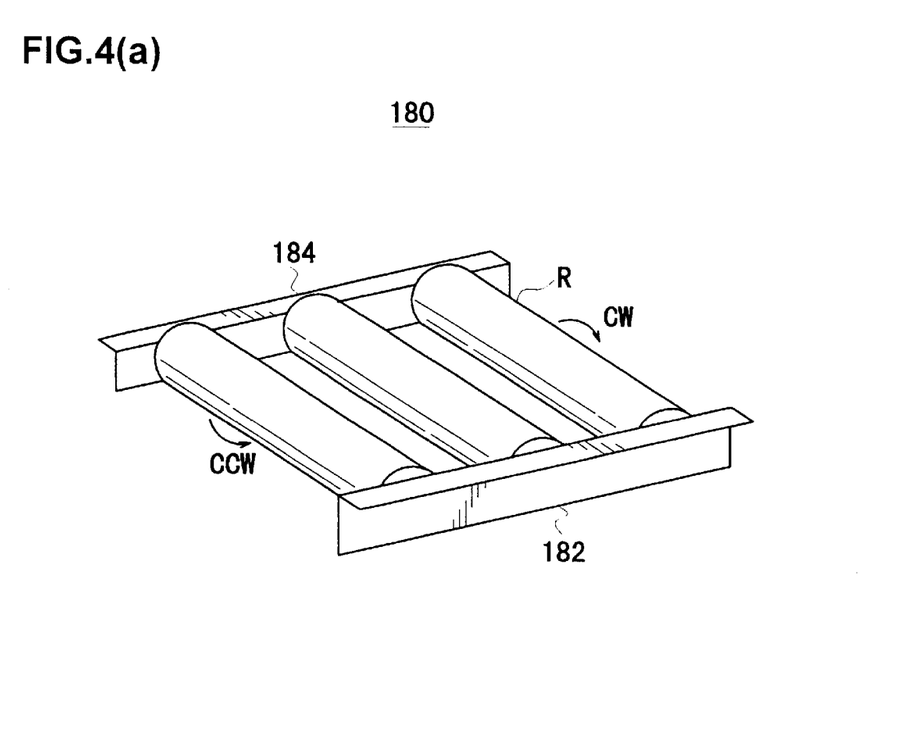
Figure 4B:
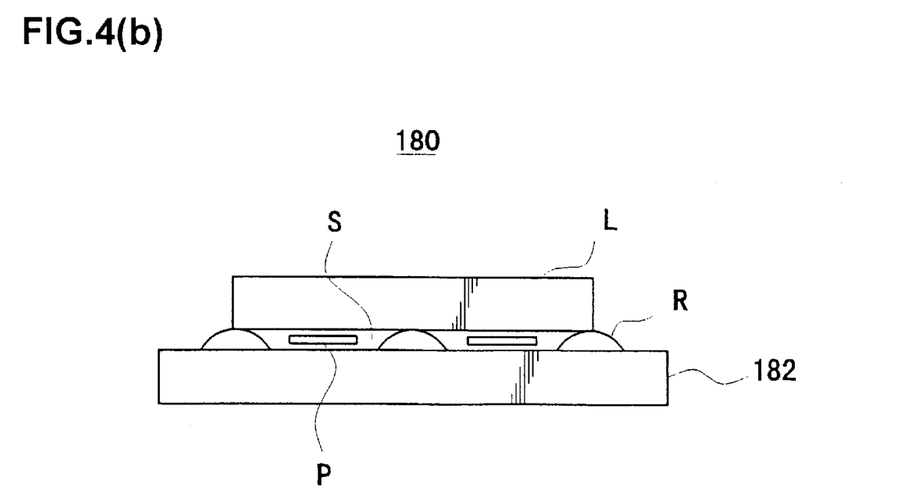

FIG. 4 includes illustrations for explaining the structure of the conveyor table 180, that is, FIG. 4(A) is a perspective view of the conveyor table and FIG. 4(B) is a side view of the same. As will be seen from this figure, the conveyor table 180 includes a series of conveyor rollers R arranged at a predetermined interval for supporting the LCD glass substrate L from the underside thereof. Both ends of each conveyor rollers R is supported by supporting members 182 and 184. Similar to the conveyor rollers R constituting the above-mentioned upper conveyor 110 or lower conveyor 120, these rollers are individually provided with a driving mechanism, which can individually drive the conveyor roller to rotate and individually stop the same.

When the conveyor table 180 constitutes a part of the upper conveyor 110, its conveyor rollers rotate clockwise (CW direction in FIG. 4(A)), thereby conveying the LCD glass substrate L in the feeding direction. Contrary to this, when the conveyor table 180 constitutes a part of the lower conveyor 120, its conveyor rollers R rotate counter clockwise (CCW direction in FIG. 4(B)), thereby conveying the LCD glass substrate L in the return direction. Furthermore, while the LCD glass substrate L is mounted on the conveyor table and the latter is moved up and down, the conveyor rollers R enters in the non-rotation state.

The LCD glass substrates L mounted on the conveyor table 180 of the vertical conveyors 160 are conveyed just as they are, into the processing device arranged side by side with the line of the conveyor system 100. The delivery and acceptance of LCD between the vertical conveyor 160 and processing device is carried out by the transfer arm installed in correspondence with processing device. This point will be described later more in detail.

As will be seen from FIG. 4(B), when the LCD glass substrate L is mounted on the conveyor rollers R of the conveyor table 180, a certain space gap S is formed between the LCD glass substrate L and conveyor roller R. The transfer arm installed on the inside of the processing devise inserts its pick (fork) P in the above space gap S, thereby putting the LCD glass substrate L on the pick (fork) P and inserting it in the processing device.

As described in the above, the vertical conveyor 160 functions as the delivery and acceptance means for conveying the LCD glass substrate L between the conveyor system 100 and processing device. Furthermore, the vertical conveyor 160 also function as a switching means for changing the conveying direction of the LCD glass substrate, for instance switching the conveying direction of the LCD glass substrate L running in the feed (or return) direction so as to let it run to the return (or feeding) direction. Still further, the vertical conveyor 160 functions as the buffer for temporarily allowing the LCD glass substrate L as refugee from the upper conveyor 110/the lower conveyor 120 to stay there.

In the next, an example of an LCD glass substrate processing system adopting the above-mentioned conveyor system 100 will be described with reference to FIG. 5. In the LCD glass substrate processing system as shown in this figure, the devices operable under the atmospheric pressure such as a cleaning equipment, a coater, a developer, an aligner and so forth, are arranged in an ordinary atmospheric pressure area while the devices operable under the reduced atmospheric pressure or in the vacuum such as an etching system, a film formation device, an ion implanter and so forth, are arranged in a reduced atmospheric pressure or vacuumed area (these devices will be generally referred to as 'processing devices' hereinafter). However, these processing devices do not constitute any feature of the invention and they are merely a set of prior art devices, so that detailed explanation thereof is omitted herein.

Figure 5:
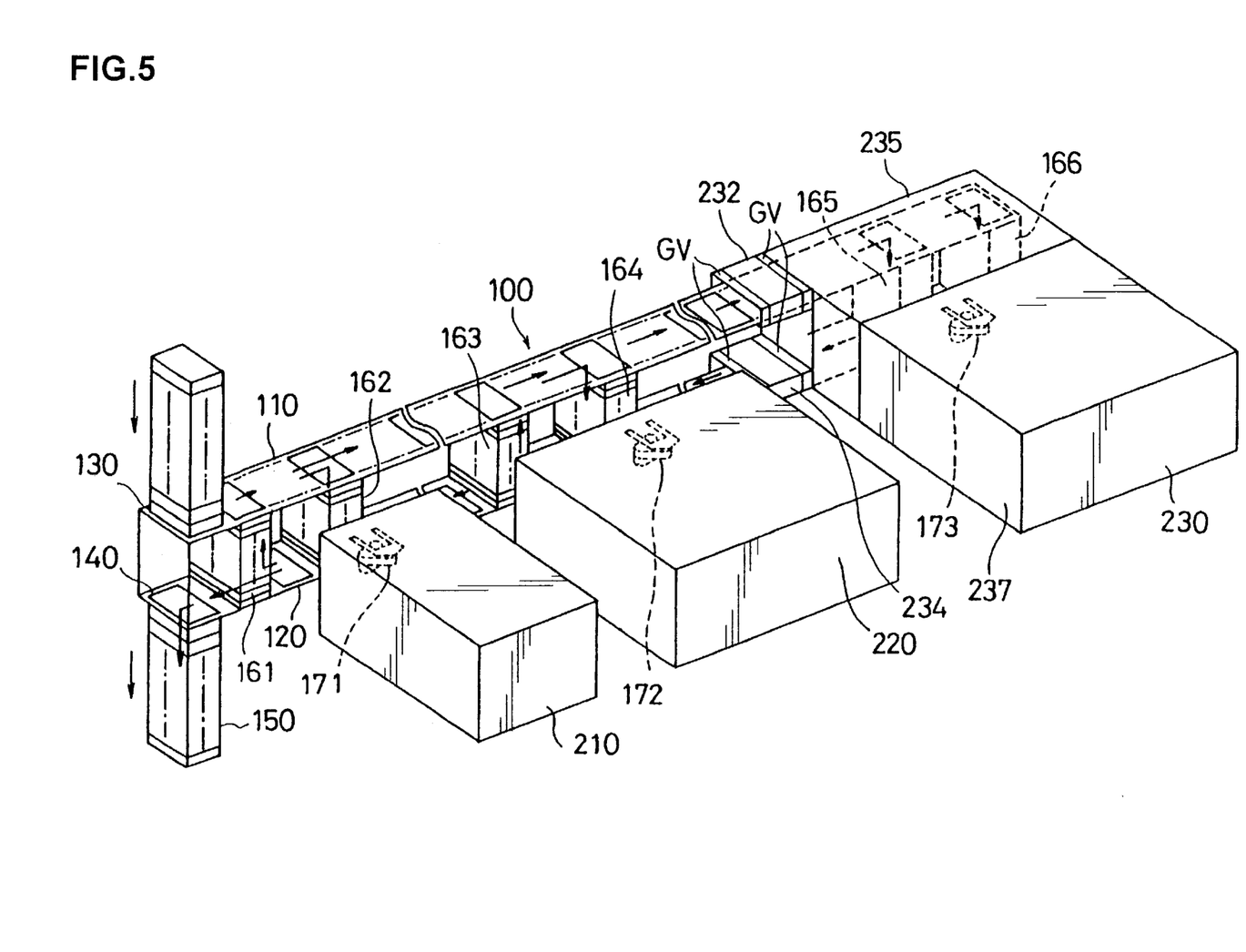
FIG. 5 is a schematic perspective view for explaining a processing system to which a conveyor system embodied according to the invention is applied.

In an example shown in FIG. 5, the processing devices 210 and 220 are arranged side by side with the conveyor system 100 in the atmospheric pressure area while the processing device 230 is arranged side by side with the same in the vacuumed area. Furthermore, load-lock chamber (preliminarily vacuumed rooms) 232 and 234 working in combination with a gate valve GV are arranged between the atmospheric pressure area and vacuumed area in order to always maintain a necessary vacuum level. As described above, the conveyor system 100 includes the upper conveyor 110, the lower conveyor 120, the vertical conveyors 161, 162, 163, 164, 165 and 166, the bring-in portion 130, and bring-out portion 140. In the example as shown in this figure, the bring-in portion 130 and bring-out portion 140 is linked to a bring-in/bring-out conveyor 150 for moving up and down LCD glass substrates L. In this FIG. 5, the vertical conveyors 161 through 166 are simply illustrated, but actually they have the structure as shown in FIG.

In this case, the etching system or the like which would belong to the vacuum processing equipment, is generally provided with the load-lock chamber, so that it may be arranged within the atmospheric pressure area.

The vertical conveyor 161 is located nearest the bring-in portion 130 (bring-out portion 140) to function as an input buffer or output buffer, or to function as a switch for switching the conveying path of the upper conveyor 110 and lower conveyor 120.

The vertical conveyor 162 is located in a position corresponding to the processing device 210 and functions as a buffer for the LCD glass substrate L or plays a role of delivery and acceptance of the LCD glass substrate L between the vertical conveyor 162 and the processing device 210. The delivery and acceptance of the LCD glass substrate L between vertical conveyor 162 and processing device 210 are executed with the help of a transfer arm 171, which will be described later.

The vertical conveyor 163 is arranged between the processing devices 210 and 220 to function as a buffer for the LCD glass substrate L or to function as a switch for switching the conveying path between the upper conveyor 110 and lower conveyor 120.

The vertical conveyor 164 is located in a position corresponding to the processing device 220 and functions as a buffer for the LCD glass substrate L or plays a role of delivery and acceptance of the LCD glass substrate L between the vertical conveyor and the processing device 220. The delivery and acceptance of the LCD glass substrate L between the vertical conveyor 164 and processing device 2210 are executed with the help of a transfer arm 172, which will be described later.

The vertical conveyor 165 is located in a position corresponding to the processing device 230 and functions as a buffer for the LCD glass substrate L or plays a role of delivery and acceptance of the LCD glass substrate L between the vertical conveyor 165 and the processing device 230. The delivery and acceptance of the LCD glass substrate L between the vertical conveyor 165 and processing device 230 are executed with the help of a transfer arm 173, which will be described later.

The vertical conveyor 166 is connected with the most downstream end of the upper conveyor 110 and also with the most upstream end of the lower conveyor 120, and functions as a buffer for the LCD glass substrate L or functions as a link for linking the upper conveyor 110 to the lower conveyor 120.

The transfer arm 171 provided in correspondence with the processing device 210 is provided with a pick (fork) P capable of putting the LCD glass substrate thereon and conveying it. Then, the LCD glass substrate mounted on the conveyor table 180 of the vertical conveyor 162 with the help of arm 171 is brought in the processing device 210. The transfer arm 171 is provided with a driving mechanism capable of driving a thing in the vertical direction, so that this arm 171 can take out the LCD glass substrate L from any one of the conveyor tables 180c, 180d, 180e and 180f. When the transfer arm 171 takes out the LCD glass substrate from the conveyor table 180c constituting a part of the upper conveyor 110, each roller R of the conveyor table 180c stops its rotation. In the same manner, when the transfer arm 171 takes out the LCD glass substrate from the conveyor table 180f constituting a part of the lower conveyor 120, each roller R of the conveyor table 180f stops its rotation.

The behavior and function of the transfer arm 171 as described above is similarly applicable to those of the transfer arms 172 and 173 provided corresponding to the processing devices 220 and 230, respectively.

FIG. 4 shows an exemplary arrangement of the processing system and conveyor system wherein vertical conveyors 162, 164 and 165 are set up in front of transfer arms 171, 172 and 173, respectively. However, it may be possible to take out the LCD glass substrate L from the upper conveyor 110 or the lower conveyor 120 without setting up the vertical conveyor in front of the transfer arm.

Figure 6:
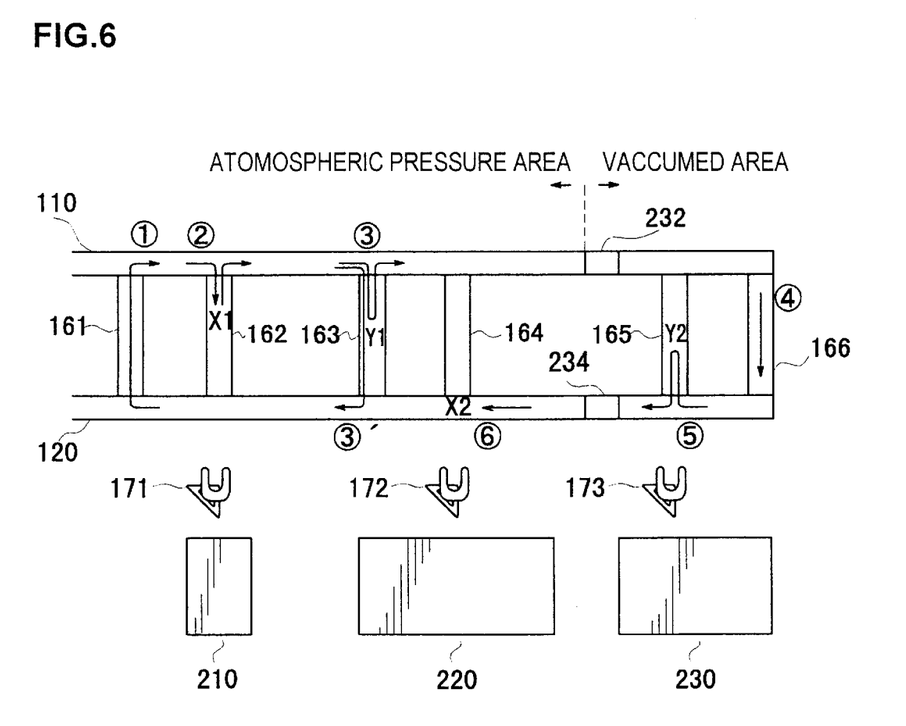
FIG. 6 is a schematic illustration for explaining the conveying operation of LCD glass substrates in the conveyor system embodied according to the invention.

FIG. 6 is a schematic illustration for explaining the behavior of the LCD glass substrate in the conveyor system 100. The behavior of LCD glass substrates will be described in the following by way of circled numeral marks 1 through 6.

(1) Mark 1 (Switching Function of Feeding Direction)

The LCD glass substrate having been conveyed in the return direction by the lower conveyor 120 is move up by the vertical conveyor 161 provided on the way of the conveying path and is conveyed in the feeding direction by the upper conveyor 110. Accordingly, with the route as marked 1, it becomes possible to treat the LCD glass substrate by means of the processing device a plurality of times.

(2) Mark 2

The LCD glass substrate is moved down up to a point marked as X1 and is then brought in the processing device 210 with the help of the transfer arm 171. After finishing the treatment thereby, the LCD glass substrate is put on the vertical conveyor 162 with the help of the transfer arm 171 and is then moved up thereby, and is further conveyed in the feeding direction by the upper conveyor 110.

(3) Marks 3 (Buffer Function) and 3' (Switching Function of Feeding Direction)

The LCD glass substrate is moved down up to a point marked as Y1 to be temporarily buffered there, and then moved up by the vertical conveyor 164 to be conveyed by the upper conveyor 110 in the feeding direction. As indicated by the mark 3', however, the LCD glass substrate being conveyed by the upper conveyor 110 may be moved down by the vertical conveyor 163 provided on the way of the conveying path to be conveyed in the return direction by the lower conveyor 120. With the route indicated by this mark 3', it becomes possible to skip out the treatment at the processing devices 220 and 230 as well, or to the contrary, to repeat a treatment by the processing device 210 a plurality of times.

(4) Mark 4 (Switching Function of Feeding Direction)

The LCD glass substrate is moved down by the vertical conveyor 166 to be conveyed in the return direction by the lower conveyor 120.

(5) Mark 5 (Buffering Function)

The LCD glass substrate is moved up by the vertical conveyor 165 up to a point marked as Y2 and is then temporarily buffered there. Then, the buffered LCD glass substrates are taken out in sequence by the transfer arm 173 to be treated at the processing device 230. The LCD glass substrates having been treated are returned to the processing devise 230. After this, the vertical conveyor 165 is moved down, thereby the LCD glass substrate being returned to the return direction by the lower conveyor 120.

(6) Mark 6

The LCD glass substrate being conveyed by the lower conveyor 120 is stopped at the point marked as X2. At this time, the operation for driving the conveyor rollers R is also stopped at the point X2. Finally, the LCD glass substrate is brought in the processing device 220 by means of the transfer arm 172.

The LCD glass substrate conveyor system according to the invention has been discussed so far by way of a preferred embodiment thereof with reference to the accompanying drawings. Needless to say, however, the invention is not to be limited by this exemplary and illustrative embodiment. It is apparent that any one who has an ordinary skill in the art is able to make various changes and modifications within the technical thoughts as recited in the scope of claim for patent as per attached hereto, and it is understood that those changes and modifications are naturally belonging to the technical scope of the invention.

The embodiment as described above has been discussed by way of an example in which the outward conveyance means (i.e. the upper conveyor 110) and inward conveyance means (i.e. the lower conveyor 120) are provided by one each, respectively. However, this should not constitute any limitation over the invention. Two or more outward conveyance means may be provided while two or more inward conveyance means may be also provided, of course.

Furthermore, the embodiment as described above has been discussed by way of an example in which the outward conveyance means (i.e. the upper conveyor 110) and inward conveyance means (i.e. the lower conveyor 120) are constructed to have a multi-storied structure. However, the outward conveyance means may be horizontally arranged in a side by side fashion with the inward conveyance means. Actually, however, to construct the outward conveyance means and inward conveyance means in the multi-storied fashion as indicated in the above example is much more advantageous from the standpoint of the footprint.

Arrangement of processing devices to which the conveyor system embodying the invention is applied, is illustratively shown in FIG. 5. However, the invention should not be limited to those which are shown in FIG. 5. Furthermore, the processing devices as set up can be removed if need be, for instance at the time of change in the processing steps, maintenance works and so forth.

Still further, the LCD glass substrate may be carried by using tray for use in LCD glass substrate. Such trays may prevent the rear side of the LCD glass substrate from dusts which might immigrate from conveyor rollers. Still further, even if the LCD glass substrate is made so thin, it would be prevented from being bent.

In the LCD glass substrate refuge portion of the vertical conveyor 160 may be provided with an electrostatic charge remover means 177 (as shown schematically in FIG. 3) for the LCD glass substrate L.

Furthermore, LCD glass substrate refuge portion of the vertical conveyor 160 may be provided with a foreign body remover means, for instance a clean air blower for blowing clean air against the LCD glass substrate L.

Still further, in the embodiment of the invention, the conveyor rollers R have been described as an example of the substrate conveyance means in the upper and lower conveyors 110 and 120. However, other means such as a belt conveyor or the like may be used instead of rollers. In this case, the belt conveyor is divided at the cross at which a horizontal conveying portion and vertical conveying portion meet with each other. Still further, in order to form a space in which the picks (fork) P 171, 172 and 173 can be inserted, the LCD glass substrate L is mounted on the projection portion formed on the belt and conveyed.

Possibility of Industrial Application

The invention is applicable to the conveyor system of the LCD glass substrate L. Especially, the invention can comply with the tendency of the LCD glass substrate growing larger.

Reference Numerals and Marks

100: Conveyor system
110 : Upper conveyor
120: Lower conveyor
130: Bring-in portion
140: Bring-out portion
150: Bring-in/bring-out conveyor
160, 161 through 166 : vertical conveyor
171 through 173 : Transfer arm
180 : conveyor table
210, 222, 230 : processing devices
232, 234: Load-lock chamber (Preliminary vacuumed chamber)
R: Conveyor roller
L: LCD glass substrate

What is claimed is:

1. A system for conveying LCD glass substrates between a plurality of processing devices comprising:
    an outward conveyance means for conveying said LCD glass substrates in a feeding direction between a plurality of said processing devices;
    an inward conveyance means arranged to make a multi-storied structure in cooperation with said outward conveyance means and to convey said LCD glass substrates in a return direction between a plurality of said processing devices; and
    a vertical conveyance means for vertically conveying said LCD glass substrates between said outward conveyance means and said inward conveyance means,
    wherein said vertical conveyance means is provided with plurality of conveyor tables for supporting said LCD glass substrates from an underside thereof, said vertical conveyance means being configured to move the conveyor tables up and down such that they move linked to each other,
    wherein one of said conveyor tables forms a part of said outward conveyance means, another of said conveyor tables forms a part of said inward conveyance means, and others of said conveyor tables form refuge portions for said LCD glass substrates,
    wherein said conveyor tables of said vertical conveyance means are provided with a series of substrate conveyance means arranged at a predetermined distance for supporting an LCD glass substrate from the underside thereof, and
    wherein said substrate conveyance means are independently driven, respectively.

2. The system of claim 1, further comprising a transfer arm for transferring said LCD glass substrate between said conveyor table forming a refuge portion for said LCD glass substrate in said vertical conveyance means and said processing device.

3. The system of claim 2, wherein said conveyor table comprises a plurality of conveyor rollers on which the LCD glass substrate is mounted, and said LCD glass substrate is transferred with the help of said transfer arm by inserting a pick of said transfer arm in a gap formed between said LCD glass substrate and the plurality of conveyor rollers.

4. The system of claim 1, wherein said outward conveyance means, said inward conveyance means, and said vertical conveyance means respectively include portions which may be arranged partly in an atmospheric pressure area and partly in a vacuum area, and
    wherein outward conveyance means and inward conveyance means that exist between the atmospheric area and the vacuum area are arranged in a load-lock chamber provided with a gate valve.

5. The system of claim 1, wherein a vertical conveyance means redirects said LCD glass substrate from being conveyed in the return direction to being conveyed in the feeding direction.

6. The system of claim 1, wherein said LCD glass substrates are transferred from said refuge portions to said processing devices.

7. The system claim 1, wherein said LCD glass substrate is transferred while housed in a tray.

8. The system of claim 1, further comprising an electrostatic charge remover means for eliminating electric charges from LCD glass substrates provided in the refuge portions of said vertical conveyance means.

9. The system of claim 1, further comprising a foreign body remover means for removing foreign bodies on the LCD glass substrate provided in at least one of said refuge portions.

10. A system for conveying LCD glass substrates between a plurality of processing devices, comprising:
    an outward conveyance means for conveying said LCD glass substrates in a feeding direction between a plurality of said processing devices;
    an inward conveyance means arranged to make a multi-storied structure in cooperation with said outward conveyance means and to convey said LCD glass substrates in a return direction between a plurality of said processing devices;
    a vertical conveyance means for vertically conveying said LCD glass substrates between said outward conveyance means and said inward conveyance means, said vertical conveyance means provided with a plurality of conveyor tables for supporting said LCD glass substrates from an underside thereof, said vertical conveyance means being configured to move the conveyor tables up and down such that they move linked to each other; and a transfer arm for transferring said LCD glass substrates between said conveyor tables in said vertical conveyance means and said processing devices, wherein one of said conveyor tables forms a part of said outward conveyance means, another of said conveyor tables forms a part of said inward conveyance means, and others of said conveyor tables form refuge portions for said LCD glass substrates.

11. The system of claim 10, wherein each of said conveyor tables comprises a plurality of conveyor rollers on which the LCD glass substrates are mounted, and said LCD glass substrates are transferred with the help of said transfer arm by inserting a pick of said transfer arm in a gap formed between said LCD glass substrate and a plurality of conveyor rollers.

12. The system claim 10, wherein said outward conveyance means, said inward conveyance means, and said vertical conveyance means respectively include portions which may be arranged partly in an atmospheric pressure area and partly in a vacuum area, and wherein a portion of said outward conveyance means and a portion of said inward conveyance means exist between the atmospheric area and said vacuum area and are arranged in a load-lock chamber provided with a gate valve.

13. A system for conveying LCD glass substrates between a plurality of processing devices comprising:

an outward conveyance means for conveying said LCD glass substrates in a feeding direction between a plurality of said processing devices;

an inward conveyance means arranged to make a multi-storied structure in cooperation with said outward conveyance means and to convey said LCD glass substrates in a return direction between a plurality of said processing devices; and a vertical conveyance means for vertically conveying said LCD glass substrates between said outward conveyance means and said inward conveyance means, wherein said vertical conveyance means is provided with plurality of conveyor tables for supporting said LCD glass substrates from an underside thereof, said vertical conveyance means being configured to move the conveyor tables up and down such that they move linked to each other, wherein one of said conveyor tables forms a part of said outward conveyance means, another of said conveyor tables forms a part of said inward conveyance means, and others of said conveyor tables form refuge portions for said LCD glass substrates, wherein said outward conveyance means, said inward conveyance means, and said vertical conveyance means respectively include portions configured to be arranged partly in an atmospheric pressure area and partly in a vacuum area, and wherein portions of said outward conveyance means and portions of said inward conveyance means existing between the atmospheric area and the vacuum area are arranged in a load-lock chamber provided with a gate valve.

\* \* \* \* \*

UNITED STATES PATENT AND TRADEMARK OFFICE
CERTIFICATE OF CORRECTION

PATENT NO. : 6,681,916 B2
DATED : January 27, 2004
INVENTOR(S) : Tsutomu Hiroki

It is certified that error appears in the above-identified patent and that said Letters Patent is hereby corrected as shown below:

<u>Title page,</u>
Item [57], ABSTRACT,
Line 13, "support the a LCD" should read -- support the LCD --.

<u>Column 12,</u>
Line 44, "system claim" should read -- system of claim --.

<u>Column 13,</u>
Line 22, "system claim" should read -- system of claim --.

Signed and Sealed this

Sixth Day of June, 2006

JON W. DUDAS
*Director of the United States Patent and Trademark Office*